United States Patent
Ruck et al.

(10) Patent No.: US 12,066,041 B2
(45) Date of Patent: Aug. 20, 2024

(54) COILED FILTER FOR HYDRAULIC COMPONENT

(71) Applicant: ZF Active Safety US Inc., Livonia, MI (US)

(72) Inventors: Gunther Ruck, Westland, MI (US); Mohamad Sader, Dearborn, MI (US); Richard J. Barron, Ann Arbor, MI (US); Brian Murphy, Livonia, MI (US)

(73) Assignee: ZF Active Safety US Inc., Livoinia, MI (US)

( * ) Notice: Subject to any disclaimer, the term of this patent is extended or adjusted under 35 U.S.C. 154(b) by 583 days.

(21) Appl. No.: 16/593,558

(22) Filed: Oct. 4, 2019

(65) Prior Publication Data
US 2021/0102562 A1 Apr. 8, 2021

(51) Int. Cl.
*F15B 21/041* (2019.01)
*B01D 24/48* (2006.01)
*B01D 29/13* (2006.01)
*B60T 17/04* (2006.01)

(52) U.S. Cl.
CPC ............ *F15B 21/041* (2013.01); *B01D 24/48* (2013.01); *B01D 29/13* (2013.01); *B60T 17/04* (2013.01)

(58) Field of Classification Search
CPC ........ F15B 21/041; F15B 13/02; B01D 24/48; B01D 29/13; B01D 29/112; B01D 29/96; B60T 17/04; B60T 13/686; B60T 17/00; F16K 27/029
USPC .......... 210/767, 495, 471, 499, 171; 184/6.9
See application file for complete search history.

(56) References Cited

U.S. PATENT DOCUMENTS

| | | | |
|---|---|---|---|
| 2005/0011703 A1* | 1/2005 | Yamaguchi | F01L 1/344 184/6.9 |
| 2013/0061959 A1* | 3/2013 | Stephens | F15B 21/041 137/544 |
| 2019/0294955 A1 | 9/2019 | Uchida et al. | |

FOREIGN PATENT DOCUMENTS

| DE | 102012203383 B3 | 1/2013 |
|---|---|---|
| DE | 102016008974 A1 | 1/2018 |
| JP | 2019155251 A | 9/2019 |
| WO | 1998/045009 A2 | 10/1998 |

OTHER PUBLICATIONS

German Search Report for corresponding German Application Serial No. 10 2020 211 991.0, dated Apr. 28, 2021, pp. 1-20.

* cited by examiner

*Primary Examiner* — Madeline Gonzalez
(74) *Attorney, Agent, or Firm* — Kristin L. Murphy (57) ABSTRACT

A coiled filter for use in a hydraulic braking system of a vehicle comprises a coiled mesh-like structure which is configured to be installed around a first surface of a cylindrical hydraulic component. The coiled filter is configured to have an internal spring force as a retention force which couples the filter to the first surface of the cylindrical hydraulic component. The filter may be pre-coiled prior to installation by plastically deforming to a diameter that is smaller than the diameter of the cylindrical hydraulic component on which the filter is installed.

17 Claims, 7 Drawing Sheets

COILED FILTER FOR HYDRAULIC COMPONENT

BACKGROUND OF THE INVENTION

This invention relates to a coil filter for use in hydraulic components, especially for use in valve bodies for hydraulic braking systems for a vehicle.

Solenoids and valve bodies are commonly used in various automotive applications. For example, a hydraulic braking system may utilize electromechanical solenoids and valve bodies to control the brake pressures applied to the tires caused by both a demand from a driver or the vehicle itself. In such electromechanical solenoids, a fluid may be configured to flow through various passageways to control an output signal. However, since solenoids and valve bodies in automotive applications are often disposed in the engine and other compartments that are prone to having debris and other potential contaminants, filters are often disposed proximate to an opening to a passageway of a valve body as a means of protection. Such filters may be integrally formed with the valve body, or standalone filters disposed proximate to the valve bodies, which may have a variety of shapes and sizes. Integrally formed filters may be more expensive and require a greater amount of research and development costs, while standalone filters may take up substantial surface area in oftentimes already space constrained areas. Standalone filters may also add significantly more weight and material use. As a result, a lighter, more compact design for a filter may be desirable.

Figure 1A:
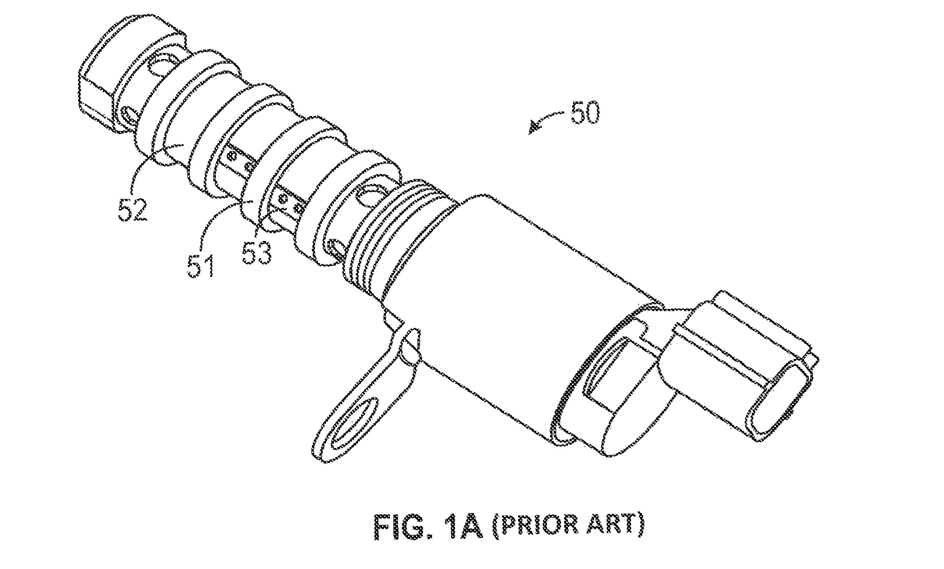
FIGS. 1A-1B are perspective views of conventional cam phaser valve bodies having filters wrapped around cylindrical bodies.
Figure 1B:
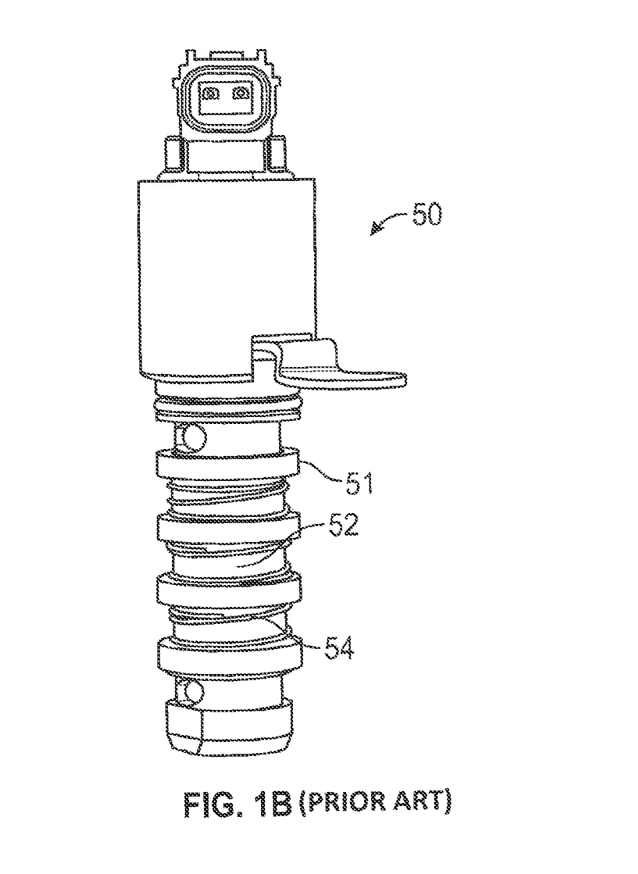

One solution to overcome the weight and size constraints previously mentioned is shown in FIGS. 1A-1B. FIGS. 1A-1B illustrate cam phaser valve bodies 50 having a filter 52 wrapped around a cylindrical body 51. The filter 52 of FIG. 1A is shown to be welded in place in a series of spot welds 53 during installation. Specifically, the filter 52 of FIG. 1A starts as a flat sheet and is engaged with the surface of the cylindrical body 51 and then wrapped around before subsequently being welded to couple the filter 52 to the cylindrical body 51 by a series of spot welds 53. FIG. 1B similarly shows the filter 52 that starts as a flat sheet and is engaged with the surface of the cylindrical body 51 before being wrapped and coupled to the cylindrical body 51 by way of formed wire 54 which wrap around the filter 30 and hold the filter 52 against the cylindrical body 51. However, as described, the filter 52 of both FIG. 1A and FIG. 1B starts as a flat sheet, which is then wrapped around the cylindrical body 51 and held in place against the cylindrical body 51 by way of either spot welds 53 or formed wire 54.

SUMMARY OF THE INVENTION

The invention relates to a filter comprising a coiled mesh-like structure which is configured to be installed around a first surface of a cylindrical hydraulic component, and wherein the filter is configured to have a radial spring force as a retention force which couples the filter to the first surface of the cylindrical hydraulic component. The cylindrical hydraulic component may include an internal passage and at least one passageway extending radially outwardly to the outside of the cylindrical hydraulic component.

The invention also relates to a filter configured to be installed proximate to the at least one passageway, such that the filter is configured to prevent foreign matter from flowing into the cylindrical hydraulic component.

The invention also relates to a filter that is configured to be pre-coiled prior to installation by plastically deforming to a second diameter that is smaller than a first diameter of a first surface of the cylindrical hydraulic component. The cylindrical hydraulic component may include at least one undercut portion having a third diameter, wherein the third diameter is less than the first diameter of the first surface of the cylindrical hydraulic component, and wherein the filter is disposed within the at least one undercut portion. The filter and the cylindrical hydraulic component may be configured to be installed into a bore. The cylindrical hydraulic component may be a valve body for a braking system.

According to another aspect, the invention provides a method of installing a filter onto a cylindrical hydraulic component comprising the steps of:
coiling a filter until it has plastically deformed to a first diameter, stretching the filter around a first surface of the cylindrical hydraulic component by stretching the filter to a second diameter that is larger than the first diameter, and
allowing the filter to elastically return to a third diameter that is larger than the first diameter and smaller than the second diameter, wherein the third diameter is configured such that the filter engages with the first surface of the cylindrical hydraulic component and provides a retention force to hold the filter in place against the cylindrical hydraulic component.

The method may further include the step of spot-welding the filter to the cylindrical hydraulic component.

According to another aspect, the invention may include a hydraulic component comprising:
a cylindrical component having a first surface; and
a coiled filter, wherein the coiled filter engages the first surface of the cylindrical component, wherein the coiled filter is pre-stressed such that a retention force is generated against the first surface of the cylindrical component, wherein the retention force is sufficient to hold the filter in place against the cylindrical component.

The first surface of the cylindrical component may be an outer surface, such that the coiled filter is disposed around the first surface of the cylindrical component, and the retention force is directed radially inward from the filter into the first surface of the cylindrical component.

The cylindrical component may further include at least one undercut portion having a first diameter, wherein the first diameter is less than the diameter of the first surface of the cylindrical component, and wherein the filter is disposed within the at least one undercut portion. The filter and cylindrical component may be configured to be installed into a bore. The cylindrical component may include at least one internal cavity.

The first surface of the cylindrical component may be an inner surface, such that the coiled filter is disposed inside of the first surface of the cylindrical component, and the retention force is directed radially outward from the filter into the first surface of the cylindrical component.

Various aspects of this invention will become apparent to those skilled in the art from the following detailed description of the preferred embodiment, when read in light of the accompanying drawings.

DETAILED DESCRIPTION OF THE PREFERRED EMBODIMENTS

Figure 2:
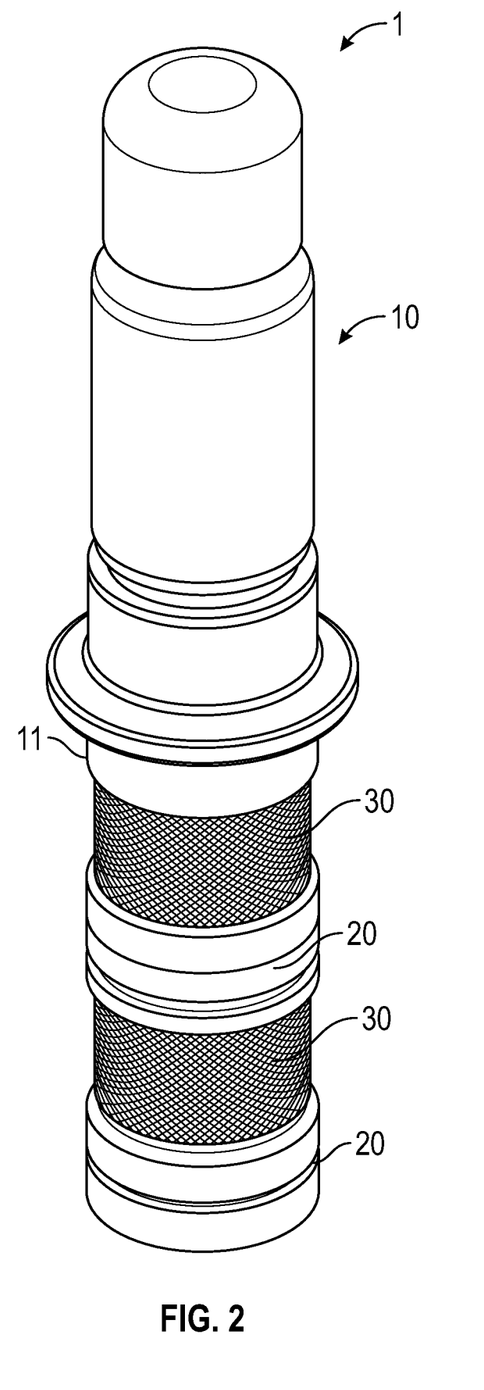
FIG. 2 is a perspective view of a hydraulic component in accordance with the invention.

Referring now to FIG. 2, a hydraulic component 1 is shown according to an exemplary embodiment. The hydraulic component 1 is shown to include a cylindrical hydraulic component 10 and a coiled filter 30 (two filters shown in FIG. 2). The hydraulic component 1 may be, for example, a valve body. More specifically, the hydraulic component 1 may be a valve body for a hydraulic braking system that is configured to be installed into a bore (not shown). The hydraulic component 1 may have a substantially cylindrical shape, defined by an outermost surface of the cylindrical hydraulic component 10, such that is configured to correspond the bore. The hydraulic component 1 may additionally include a plurality of O-rings 20 around a first surface 11 of the cylindrical hydraulic component 10. The O-rings 20 may be made of rubber or any other suitable material, and may be configured to be compressed between cylindrical hydraulic component 10 and an inner surface of the bore. In this way, the O-rings 20 may beneficially act as a seal to protect from contaminants and foreign matter, and may also provide a relatively compressible buffer to accommodate varying tolerances of the bore and cylindrical hydraulic component 10.

As shown in FIG. 2, the radially outermost surface of the cylindrical hydraulic component 10 may radially extend beyond the first surface 11 of the filter 30. In this way, it should be appreciated that when the hydraulic component 1 is installed into a bore, the filter 30 may not require any additional surface area than the cylindrical hydraulic component 10.

Figure 3:
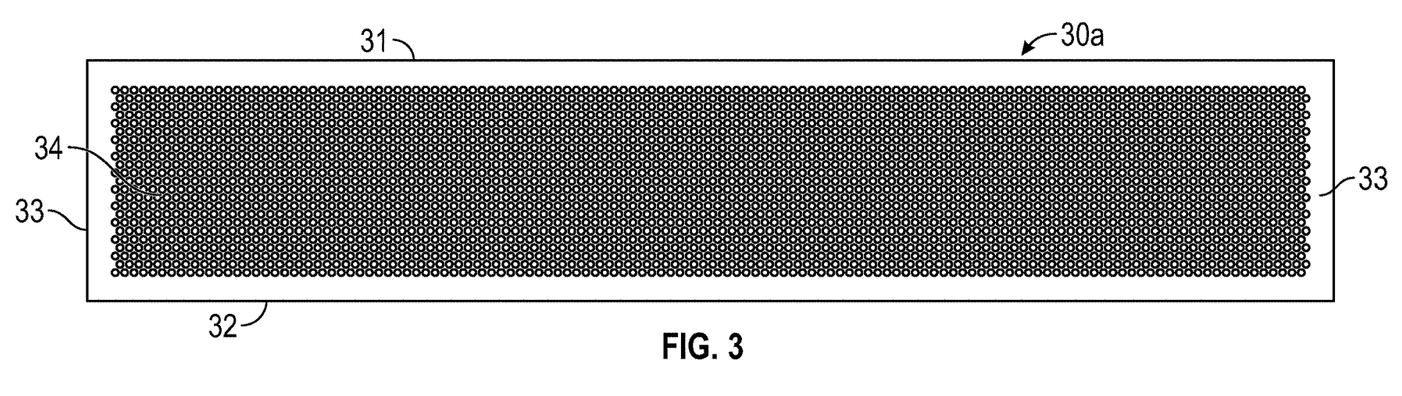
FIG. 3 is a view of a mesh-like filter before the filter is coiled in accordance with the invention.

Referring now to FIG. 3, a mesh-like filter 30a is shown according to an exemplary embodiment. In one embodiment, the mesh-like filter 30a may be made of stainless steel. However, it should be appreciated that the mesh-like filter 30a could be made of any other suitable metal or other material. The filter 30a is shown to include an upper surface 31, a parallel lower surface 32, and parallel end surfaces 33 (i.e., the mesh-like filter 30a may be rectangular and have a substantially flat cross section). A mesh-like area 34 of the filter 30a may contain through going perforations on a limited portion or the entire portion of the mesh-like filter 30. The mesh-like area 34 may be configured to allow fluid to penetrate through the filter 30a, while preventing contaminants and foreign matter from passing through. In manufacturing, the mesh-like area 34 may be created by way of, for example, photoetching. The mesh-like filter 30a is configured to be coiled around a series of pins, so as to plastically deform the mesh-like filter 30a into a coiled filter 30 having a substantially cylindrical shape.

Figure 4:
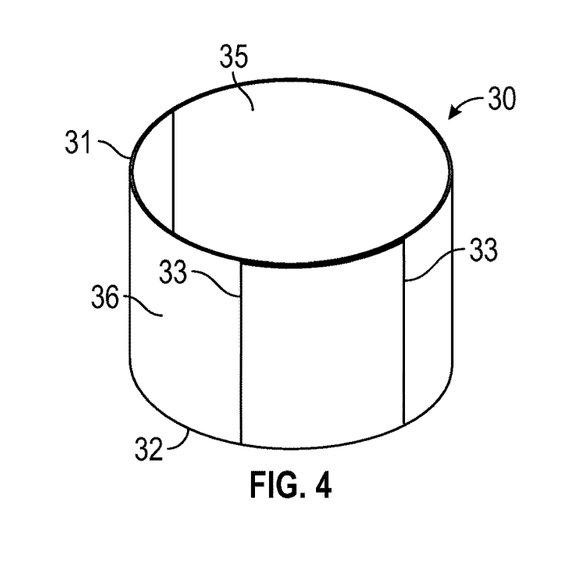
FIG. 4 is a perspective view of a coiled filter in accordance with the invention.

Referring now to FIG. 4, the coiled filter 30 is shown according to an exemplary embodiment. The coiled filter 30 may have a substantially cylindrical shape, wherein the upper surface 31 and the lower surface 32 are parallel. In addition, after the filter 30 has been coiled, the parallel end surfaces 33 may or may not overlap one another. The coiled filter 30 is shown to include an inner surface 35 and an outer surface 36. It should be appreciated that after the filter 30 has been coiled to the point of plastic deformation, the filter 30 may have an internal spring force which may hold the filter 30 to a given diameter. If the filter 30 is placed around an object having a larger diameter than the coiled diameter, the filter 30 may exhibit an inward retention force against the object (i.e., the inner surface 35 of the filter 30 may bias against the outer surface of the object). Similarly, if the filter 30 is compressed to a diameter which is smaller than the resting plastically deformed diameter, and the filter 30 is placed inside of an object which is also smaller than the resting plastically deformed diameter, the filter 30 may exhibit an outward retention force against the object (i.e., the outer surface 36 of the filter 30 may bias against the inner surface of the object).

Figure 5:
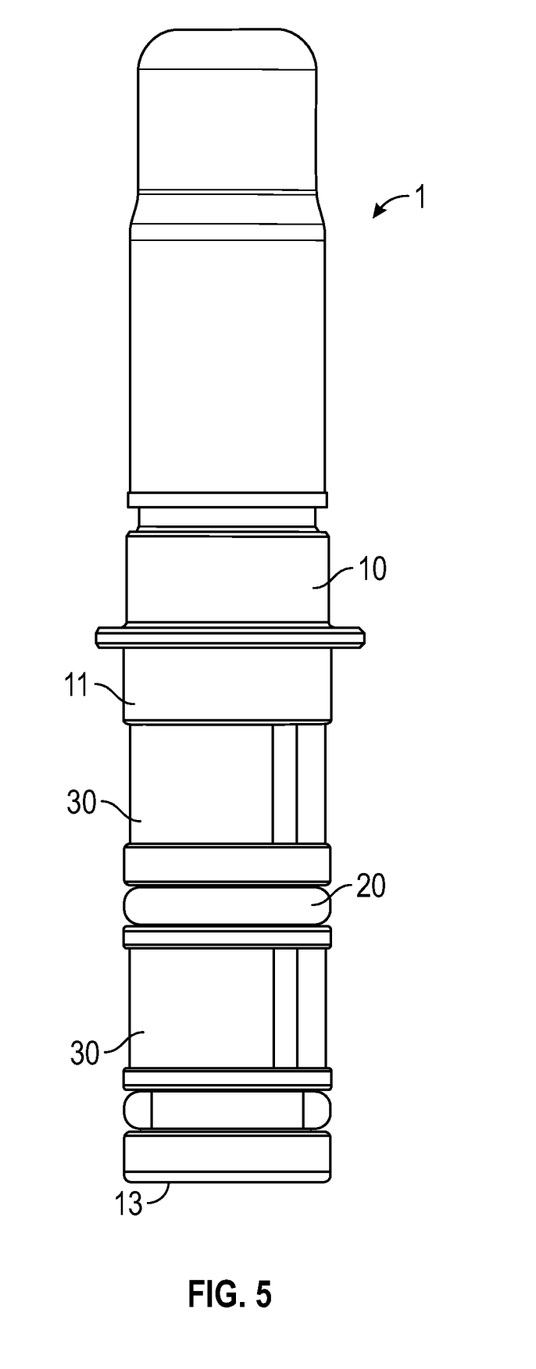
FIG. 5 is a front elevation view of the hydraulic component of FIG. 1.
Figure 6:
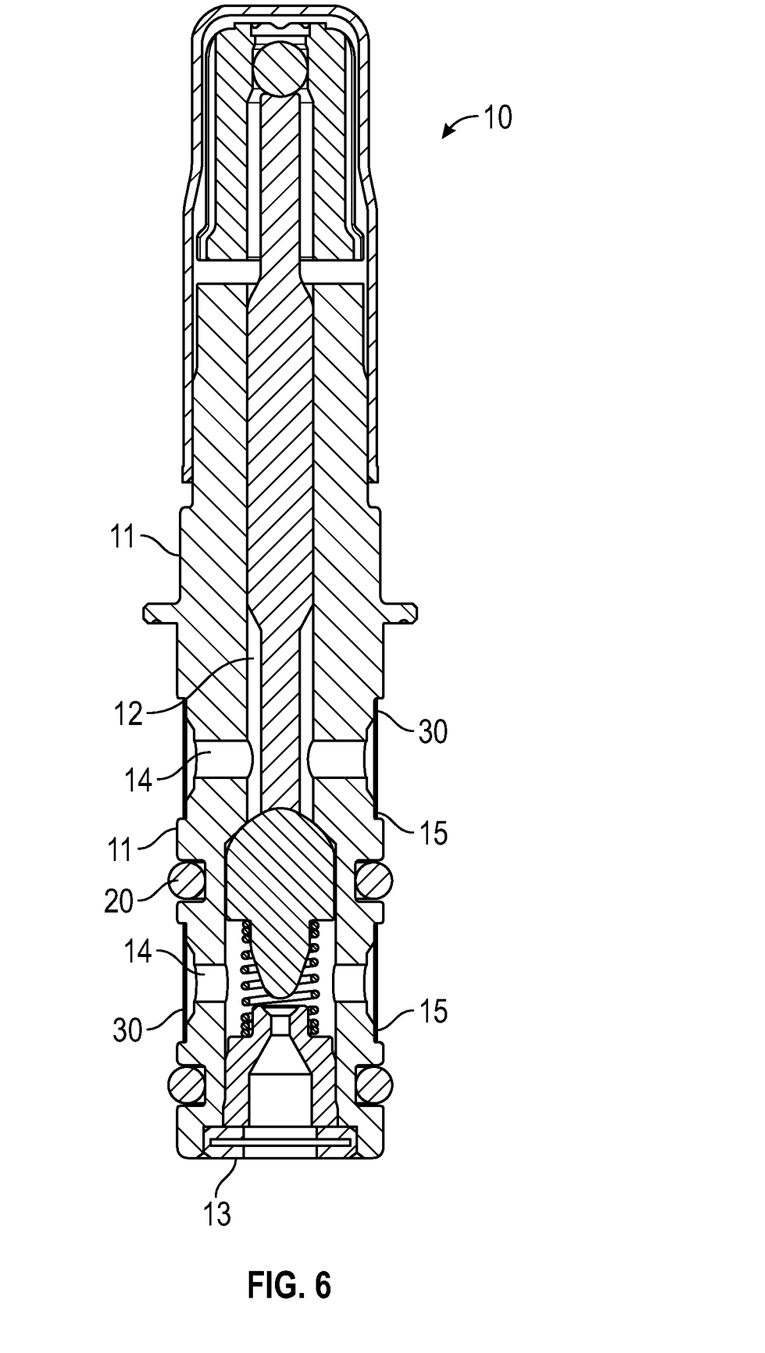
FIG. 6 is a cross section of the hydraulic component of FIG. 1 showing internal passageways of the cylindrical hydraulic component.

Referring now to FIGS. 5-6, the cylindrical hydraulic component 10 of the hydraulic component 1 will be described in greater detail. As described, the cylindrical hydraulic component 10 may have a substantially cylindrical shape and may be configured to be installed into a cylindrical bore. The first surface 11 may be an outer surface of the cylindrical hydraulic component 10 having a first diameter that corresponds to the cylindrical bore. As shown in FIG. 6, the cylindrical hydraulic component 10 may further include a longitudinally extending internal passage 12 which may terminate at a lower end 13 of the cylindrical hydraulic component 10. The internal passage 12 may be coupled to at least one radially outwardly extending passageway 14. The passageway 14 may be configured to selectively allow fluid to flow into and out of the cylindrical hydraulic component 10. The filter 30 may be configured to be installed proximate to the at least one passageway 14. As such, the filter 30 may be configured to prevent contaminants and foreign matter from flowing into the cylindrical hydraulic component 10.

The cylindrical hydraulic component 10 is shown to include at least one undercut portion 15. The undercut portion 15 has a diameter that is smaller than the first diameter of the first surface 11 of the cylindrical hydraulic component 10. The undercut portion 15 may be configured to receive a filter 30 around a circumference of the undercut portion 15. In some embodiments, when a filter 30 is disposed around the undercut portion 15, the undercut portion 15 and the thickness of the filter 30 may not extend radially outwardly as far as the first surface 11 of the cylindrical hydraulic component 10. In this way, it should be appreciated that the undercut portion 15 may allow for the filter 30 to be installed onto the cylindrical hydraulic component 10 without requiring any additional space. In addition, it should be appreciated that the undercut portion 15 may also limit lateral movement of the filter 30, relative to the cylindrical hydraulic component.

Figure 7A:
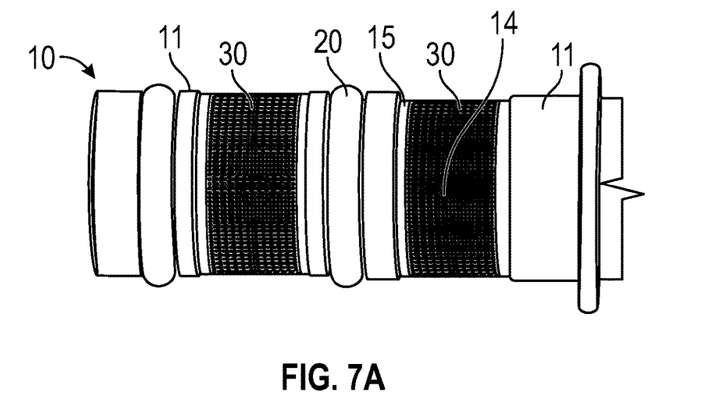
FIG. 7A is a view of the hydraulic component specifically showing the coiled filter installed onto the cylindrical hydraulic component.
Figure 7B:
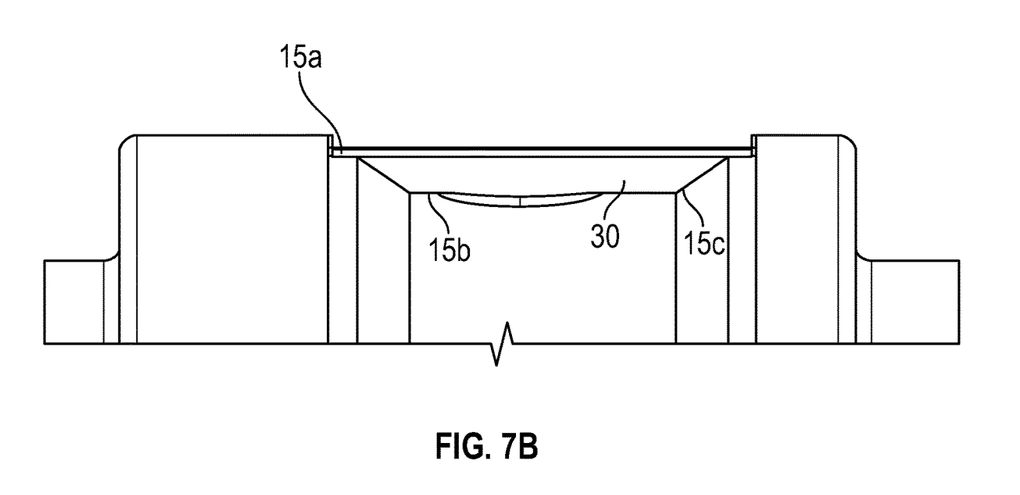
FIG. 7B is a schematic of a partial cross sectional view of the coiled filter installed onto the cylindrical hydraulic component showing various aspects in greater detail.

Referring now to FIGS. 7A-7B, views of the hydraulic component specifically showing the coiled filter installed onto the cylindrical hydraulic component are shown, according to an exemplary embodiment. As previously described, when the filters 30 are installed in the undercut portion 15, the first surface 11 of the cylindrical hydraulic component 10 may extend radially outwardly beyond the undercut portion 15 and the filter 30. In addition, the undercut portion 15 may include a step-profile which to provide additional benefits when the filter is installed. For example, the undercut portion 15 may include a flat 15a and a recessed surface 15b which may be connected by a sloped surface 15c. The inner surface 35 of the filter 30 may be configured to engage with the flat 15a.

In addition, some embodiments the filter 30 may be spot-welded to the cylindrical hydraulic component 10. The flats 15a provide for a secure and convenient location for the filter 30 to be spot-welded to the cylindrical hydraulic component 10. The radially extending passageways 14 may be configured to terminate at the recessed surface 15b of the undercut portion 15. As shown in FIG. 7B, the recessed surface 15b may have a smaller diameter than the flats 15a. When the filter 30 is installed such that the inner surface 35 engages with the flats 15a, a gap may exist between the inner surface 35 of the filter 30 and the recessed surface 15b.

Figure 8A:
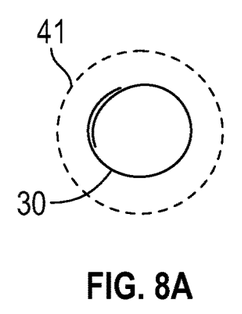
FIGS. 8A-8C are a series of schematics showing the relative profile of a coiled filter as it is installed onto an outer surface of a cylindrical component, according to the current embodiment.
Figure 8B:
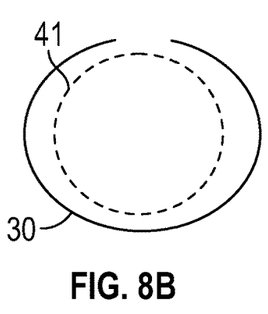
Figure 8C:
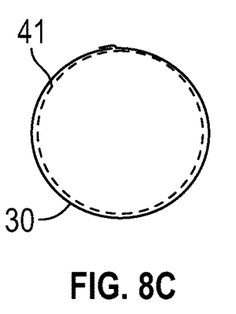

Referring now to FIGS. 8A-8C, a series of schematics showing the relative profile of a coiled filter as it is installed onto an outer surface of a cylindrical component is shown, according to an exemplary embodiment. The filter 30 may begin as a substantially flat rectangular filter 30a. The filter 30a may be tightly coiled around a series of pins, to the point where the filter plastically deforms to become a coiled filter 30 having a first diameter. As shown in FIG. 8A, the first diameter of the coiled filter 30 may have a smaller diameter than a first surface 41 of a cylindrical component. Next, as shown in FIG. 8B in order to install the filter 30 onto the outer surface of the cylindrical component, the filter 30 may be stretched to a diameter that is greater than the first surface 41. While the filter 30 is stretched, the filter 30 may then be positioned such that the cylindrical component is received within the inner surface 35 of the filter 30. As shown in FIG. 8C, when the filter 30 is released and allowed to elastically return toward the first diameter, the inner surface 35 of the filter 30 may engage with the first surface 41 of the cylindrical component and settle at a third diameter. The filter 30 may exhibit inward retention force against the first surface 41 of the cylindrical component due to being pre-stressed (i.e., from the coiling process). The retention force may be sufficient to hold the filter 30 in place against the cylindrical component.

Figure 9A:
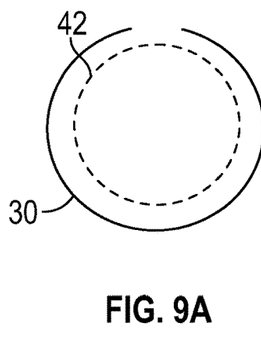
FIGS. 9A-9C are a series of schematics showing the relative profile of a coiled filter as it is installed into a cylindrical component having a cavity, according to another embodiment.
Figure 9B:
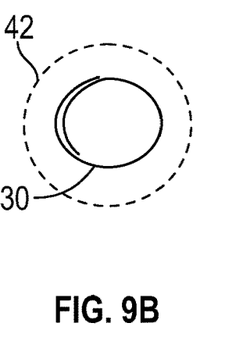
Figure 9C:
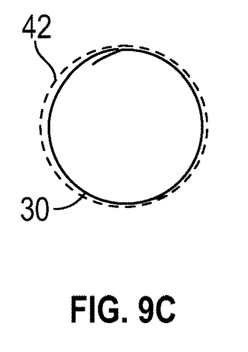

Referring now to FIGS. 9A-9C, a series of schematics showing the relative profile of a coiled filter as it is installed into a cylindrical component having a cavity is shown, according to a second embodiment. FIGS. 9A-9C depict a similar process as FIGS. 8A-8C, except unlike the previous schematics, where the inner surface 35 of the filter 30 was providing an inward retention force against the cylindrical component, in the present schematics, the outer surface 36 of the filter 30 may prove an outward retention force against an inner surface of a cylindrical component. As shown in FIG. 9A, the first diameter of the coiled filter 30 may have a larger diameter than a first surface 42 of a cylindrical component. For example, the cylindrical component may include a cylindrical cavity wherein the inner surface is the first surface 42. The outer surface 36 of the filter 30 may be configured to engage with the first surface 42 of the cylindrical component. Next, as shown in FIG. 9B, in order to install the filter 30 into the cavity of the cylindrical component, the filter 30 may be compressed to a diameter that is smaller than the first surface 42. While the filter 30 is compressed, the filter 30 may be repositioned such that the filter 30 is received within and concentrically aligned with the cylindrical component. As shown in FIG. 9C, when the filter 30 is released and allowed to elastically return toward the first diameter, the outer surface 36 of the filter 30 may engage with the first surface 42 of the cylindrical component and settle at a third diameter. The filter 30 may exhibit outward retention force against the first surface 42 of the cylindrical component. The retention force may be sufficient to hold the filter 30 in place against the cylindrical component.

Figure 10:
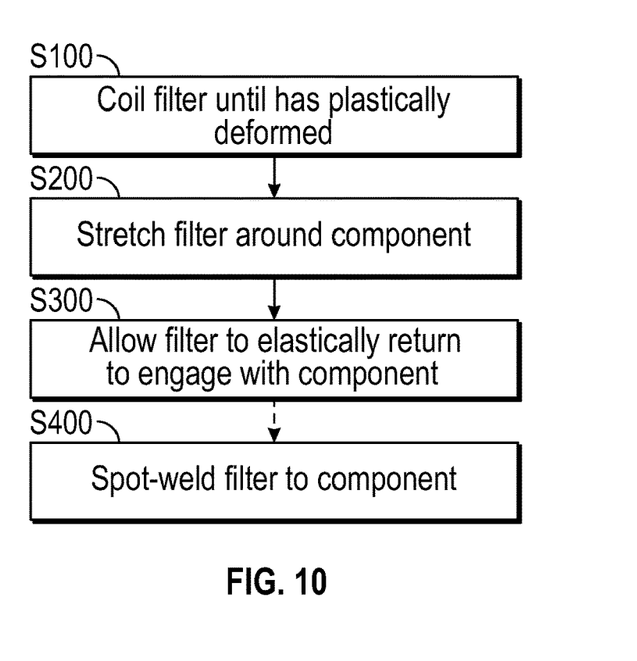
FIG. 10 is a diagram of the steps of installing a coiled filter onto a hydraulic component.

Referring now to FIG. 10, a diagram of a method of installing a filter 30 onto a cylindrical hydraulic component is shown, according to the exemplary embodiment. Step 100 includes the step of coiling a filter until it has plastically deformed to a first diameter. For example, referring to FIG. 8A, the filter 30 may be coiled to a first diameter which is smaller than a first surface 11 of a cylindrical hydraulic component 10. The filter 30 may be coiled tight enough that it exceeds the elastic modulus of the material that the filter 30 is made of, causing the filter 30 to plastically deform to a first diameter.

Step 200 includes stretching the filter around a first surface of the cylindrical hydraulic component by stretching the filter to a second diameter that is larger than the first diameter. As shown in FIG. 8B, the filter 30 may be stretched beyond the first surface 11 of a cylindrical hydraulic component 10, such that the cylindrical hydraulic component 10 may then be received radially inside of the filter 30 (i.e., the inner surface 35 of the filter 30 engages with the first surface 11 of the cylindrical hydraulic component 10).

Step 300 includes the step of allowing the filter to elastically return to a third diameter. The third diameter may be when the filter 30 is engaging with the first surface 11 of the cylindrical hydraulic component 10. In this way, the third diameter is understood to be larger than the first diameter (i.e., the plastically deformed diameter after coiling) and smaller than the second diameter (i.e., the stretched diameter to allow the filter 30 to surround the cylindrical hydraulic component).

After the filter 30 is installed onto the cylindrical hydraulic component 10, the retention force exhibited radially inward from the filter 30 onto the cylindrical hydraulic component 10 is sufficient to hold the filter 30 in place. However, as an additional means of security for the filter 30, at Step 400, the filter may be spot-welded to the cylindrical hydraulic component. While this is an optional step, spot-welding may be beneficial to provide additional strength for when the filter 30 and cylindrical hydraulic component 10 are installed into, for example, a bore. In addition, should the retention force of the filter 30 decrease over time, the spot welds may provide an additional coupling means for the filter 30 and the cylindrical hydraulic component 10.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A filter comprising:

A coiled mesh-like structure which is configured to be installed around and engage an outer surface of a cylindrical hydraulic component, the coiled mesh-like structure having a first portion that overlaps a second portion, the first portion including and extending circumferentially from a circumferentially facing and axially extending first end surface of the coiled mesh-like structure toward a circumferentially facing and axially extending second end surface of the coiled mesh-like structure, the second portion including and extending circumferentially from the second end surface of the coiled mesh-like structure toward the first end surface of the coiled mesh-like structure, an entirety of the first portion directly contacting the second portion and having a curvature that directly follows a curvature of the second portion when the coiled mesh-like structure is installed around and engages the outer surface of the cylindrical hydraulic component, and wherein the filter is configured to have an internal spring force as a radially inwardly directed retention force which couples the filter to the outer surface of the cylindrical hydraulic component.

2. The filter of claim 1 wherein the cylindrical hydraulic component includes an internal passage and at least one passageway extending radially outwardly to the outside of the cylindrical hydraulic component.

3. The filter of claim 2 wherein the filter is configured to be installed proximate to the at least one passageway, such that the filter is configured to prevent foreign matter from flowing into the cylindrical hydraulic component.

4. The filter of claim 1 wherein the filter is pre-coiled prior to installation by plastically deforming to a second diameter that is smaller than a first diameter of the outer surface of the cylindrical hydraulic component.

5. The filter of claim 1 wherein the outer surface of the cylindrical hydraulic component includes a first surface having a first diameter and at least one undercut portion having a third diameter, wherein the third diameter is less than the first diameter of the first surface of the cylindrical hydraulic component, and wherein the filter is disposed within the at least one undercut portion.

6. The filter of claim 5 wherein the filter and the cylindrical hydraulic component are configured to be installed into a bore.

7. The filter of claim 1 wherein the cylindrical hydraulic component is a valve body for a braking system.

8. A method of installing a filter onto a cylindrical hydraulic component comprising the steps of:
providing the filter of claim 1;
coiling the filter until it has plastically deformed to a first diameter;
stretching the filter around an outer surface of the cylindrical hydraulic component by stretching the filter to a second diameter that is larger than the first diameter; and
allowing the filter to elastically return to a third diameter that is larger than the first diameter and smaller than the second diameter, the third diameter being configured such that the filter engages the outer surface of the cylindrical hydraulic component and provides the internal spring force as the radially inwardly directed retention force to hold the filter in place against the cylindrical hydraulic component.

9. The method of claim 8, further comprising the step of spot-welding the filter to the cylindrical hydraulic component.

10. A hydraulic component comprising:
a cylindrical hydraulic component; and
the filter of claim 1, wherein the filter is pre-stressed such that the radially inwardly directed retention force is generated against the outer surface of the cylindrical hydraulic component, wherein the retention force is sufficient to hold the filter in place against the cylindrical hydraulic component.

11. The hydraulic component of claim 10, wherein the outer surface of the cylindrical hydraulic component includes a first surface having a first diameter and at least one undercut portion having a second diameter, wherein the second diameter is less than the first diameter, and wherein the filter is disposed within the at least one undercut portion.

12. The hydraulic component of claim 10, wherein the filter and the cylindrical hydraulic component are configured to be installed into a bore.

13. The hydraulic component of claim 10, wherein the cylindrical hydraulic component includes at least one internal cavity.

14. The hydraulic component of claim 10, wherein the hydraulic component is a valve body for a hydraulic braking system.

15. The filter of claim 1, wherein the first portion extends circumferentially from the first end surface to a position on the coiled mesh-like structure that is radially adjacent to the second end surface, the second portion extending circumferentially from the second end surface to a position on the coiled mesh-like structure that is radially adjacent to the first end surface.

16. The filter of claim 1, wherein the coiled mesh-like structure includes a radially inner surface and a radially outer surface that each extend circumferentially from the first end surface to the second end surface, each of the first and second end surfaces extending radially between the radially inner surface and the radially outer surface.

17. The filter of claim 16, wherein along the entirety of the first portion, the radially outer surface directly contacts the radially inner surface when the coiled mesh-like structure is installed around and engages the outer surface of the cylindrical hydraulic component, the first portion extending circumferentially from the first end surface to a position on the coiled mesh-like structure that is radially adjacent to the second end surface, the second portion extending circumferentially from the second end surface to a position on the coiled mesh-like structure that is radially adjacent to the first end surface.

* * * * *